US010099390B2

(12) United States Patent
Okamoto

(10) Patent No.: US 10,099,390 B2
(45) Date of Patent: Oct. 16, 2018

(54) ROBOT

(71) Applicant: Seiko Epson Corporation, Tokyo (JP)

(72) Inventor: Junichi Okamoto, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/840,207

(22) Filed: Dec. 13, 2017

(65) Prior Publication Data

US 2018/0169872 A1 Jun. 21, 2018

(30) Foreign Application Priority Data

Dec. 16, 2016 (JP) ................. 2016-244749

(51) Int. Cl.
| | | |
|---|---|---|
| *G02B 6/26* | (2006.01) | |
| *G02B 6/42* | (2006.01) | |
| *B25J 19/00* | (2006.01) | |
| *G02B 6/44* | (2006.01) | |
| *G02B 6/36* | (2006.01) | |

(52) U.S. Cl.
CPC ........ *B25J 19/0037* (2013.01); *G02B 6/3604* (2013.01); *G02B 6/4416* (2013.01)

(58) Field of Classification Search
CPC ... B25J 19/0037; G02B 6/3604; G02B 6/4416
USPC ........................................................ 385/26
See application file for complete search history.

(56) References Cited

U.S. PATENT DOCUMENTS

| | | | | | |
|---|---|---|---|---|---|
| 4,545,713 | A | * | 10/1985 | Beni ................. | B23K 26/0884 |
| | | | | | 219/121.78 |
| 5,633,967 | A | * | 5/1997 | Haruta ................. | B23K 26/06 |
| | | | | | 385/33 |
| 2009/0310911 | A1 | | 12/2009 | Zhang et al. | |
| 2011/0141697 | A1 | * | 6/2011 | Fujii ................. | G02F 1/133308 |
| | | | | | 361/707 |

FOREIGN PATENT DOCUMENTS

| | | |
|---|---|---|
| JP | 58-007115 A | 1/1983 |
| JP | 58-105203 A | 6/1983 |
| JP | 05-096484 A | 4/1993 |
| JP | 2015-225184 A | 12/2015 |

* cited by examiner

*Primary Examiner* — Jerry Blevins
(74) *Attorney, Agent, or Firm* — Harness, Dickey & Pierce, P.L.C.

(57) ABSTRACT

A robot includes: a first arm that has a first light guide path, a second arm that has a second light guide path, a joint portion that has a rotation axis and connects the first arm and the second arm to each other so as to be rotatable about the rotation axis and a light rotary joint that is provided between the first light guide path and the second light guide path inside the joint portion and that optically connects the first light guide path and the second light guide path to each other. In addition, the light rotary joint has a first light guide portion which is fixed to the first light guide path and has a tubular shape about the rotation axis and an end portion of the second light guide path on the light rotary joint side faces the first light guide portion.

11 Claims, 13 Drawing Sheets

ROBOT

BACKGROUND

1. Technical Field

The present invention relates to a robot.

2. Related Art

For example, the robot described in JP-A-5-96484 is known as an industrial multi-joint robot. The robot of JP-A-5-96484 includes a base, a multi-joint arm attached to the base, and a hand which is provided on a distal end of the multi-joint arm. In addition, a TV camera is built in the hand.

However, in the robot of JP-A-5-96484, for example, since electric wiring of an electronic component such as the TV camera is disposed through a joint of a multi-joint arm, it is difficult to miniaturize the joint.

SUMMARY

An advantage of some aspects of the invention is to provide a robot that can miniaturize a joint portion.

The advantage can be achieved by the following configurations.

A robot according to an aspect of the invention includes: a first arm that has a first light guide path, a second arm that has a second light guide path, a joint portion that has a rotation axis and connects the first arm and the second arm to each other so as to be rotatable about the rotation axis, and a light rotary joint that is provided between the first light guide path and the second light guide path inside the joint portion and that optically connects the first light guide path and the second light guide path to each other.

With this configuration, since at least a portion of electric wiring as in the related art can be replaced with optical wiring, the number of the electric wiring which passes through the joint portion can be reduced. Therefore, the miniaturization of the joint portion can be achieved. In addition, since the first and second light guide paths are not twisted due to the rotation of the joint portion, damage of the first and second light guide paths and decrease in light propagation efficiency the first and second light guide paths due to excessive deformation thereof are suppressed and thus reliability of the robot is improved.

In the robot according to the aspect of the invention, it is preferable that the light rotary joint has a first light guide portion which is fixed to the first light guide path and has a tubular shape about the rotation axis and an end portion of the second light guide path on the light rotary joint side faces the first light guide portion.

With this configuration, the first light guide path and the second light guide path can be optically connected via the first light guide portion, regardless of a rotation state of the second arm.

In the robot according to the aspect of the invention, it is preferable that the first light guide portion has an outer diameter gradually decreasing portion of which an outer diameter gradually decreases from a second light guide path side toward a first light guide path side.

With this configuration, the loss of light in the first light guide portion can be effectively reduced.

In the robot according to the aspect of the invention, it is preferable that the first light guide path has an oblique incision cylindrical shape.

With this configuration, the loss of light in the first light guide portion can be effectively reduced.

In the robot according to the aspect of the invention, it is preferable that the first light guide portion includes a diffusing material which diffuses light.

With this configuration, the loss of light in the first light guide portion can be effectively reduced.

In the robot according to the aspect of the invention, it is preferable that the robot has a third light guide path that is disposed on the first arm and is different from the first light guide path and a fourth light guide path that is disposed on the second arm and is different from the second light guide path, and the light rotary joint has a second light guide portion which is disposed inside the first light guide portion and optically connects the third light guide path and the fourth light guide path to each other.

With this configuration, bi-directional optical communication can be performed by using the first light guide portion and the second light guide portion. Therefore, the convenience of the robot is improved.

In the robot according to the aspect of the invention, it is preferable that the second light guide portion is fixed to the third light guide path and has a tubular shape about the rotation axis and an end portion of the fourth light guide path on the light rotary joint side faces the second light guide portion.

With this configuration, the third light guide path and the fourth light guide path can be optically connected to each other via the second light guide portion, regardless of a rotation state of the second arm.

In the robot according to the aspect of the invention, it is preferable that the second light guide portion is fixed to the third light guide path and is disposed on the rotation axis, and the end portion of the fourth light guide path on the light rotary joint side faces the second light guide portion.

With this configuration, the third light guide path and the fourth light guide path can be optically connected to each other via the second light guide portion, regardless of the rotation state of the second arm.

In the robot according to the aspect of the invention, it is preferable that the robot has electric wiring which is disposed inside the joint portion and the electric wiring is positioned inside the first light guide portion.

With this configuration, space of the joint portion can be effectively used and both optical wiring and electric wiring can be routed while the joint portion is miniaturized.

In the robot according to the aspect of the invention, it is preferable that the robot has the electric wiring which is disposed inside the joint portion and the electric wiring is positioned outside the first light guide portion.

With this configuration, the space of the joint portion can be effectively used and both optical wiring and electric wiring can be routed while the joint portion is miniaturized.

In the robot according to the aspect of the invention, it is preferable that the robot has an electronic component which is disposed on closer to the second arm side than the joint portion and is connected to the second light guide path.

With this configuration, for example, control signal to the electronic component and output signal (detection signals of electronic component) from the electronic component can be optically communicated via the light rotary joint. Therefore, the communication speed of these signals can increase and robots having higher precision can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the robot of the invention will be described in detail based on a preferred embodiment illustrated in the attached drawings.

First Embodiment

First, the optical connection device according to the first embodiment of the invention will be described.

Figure 1:
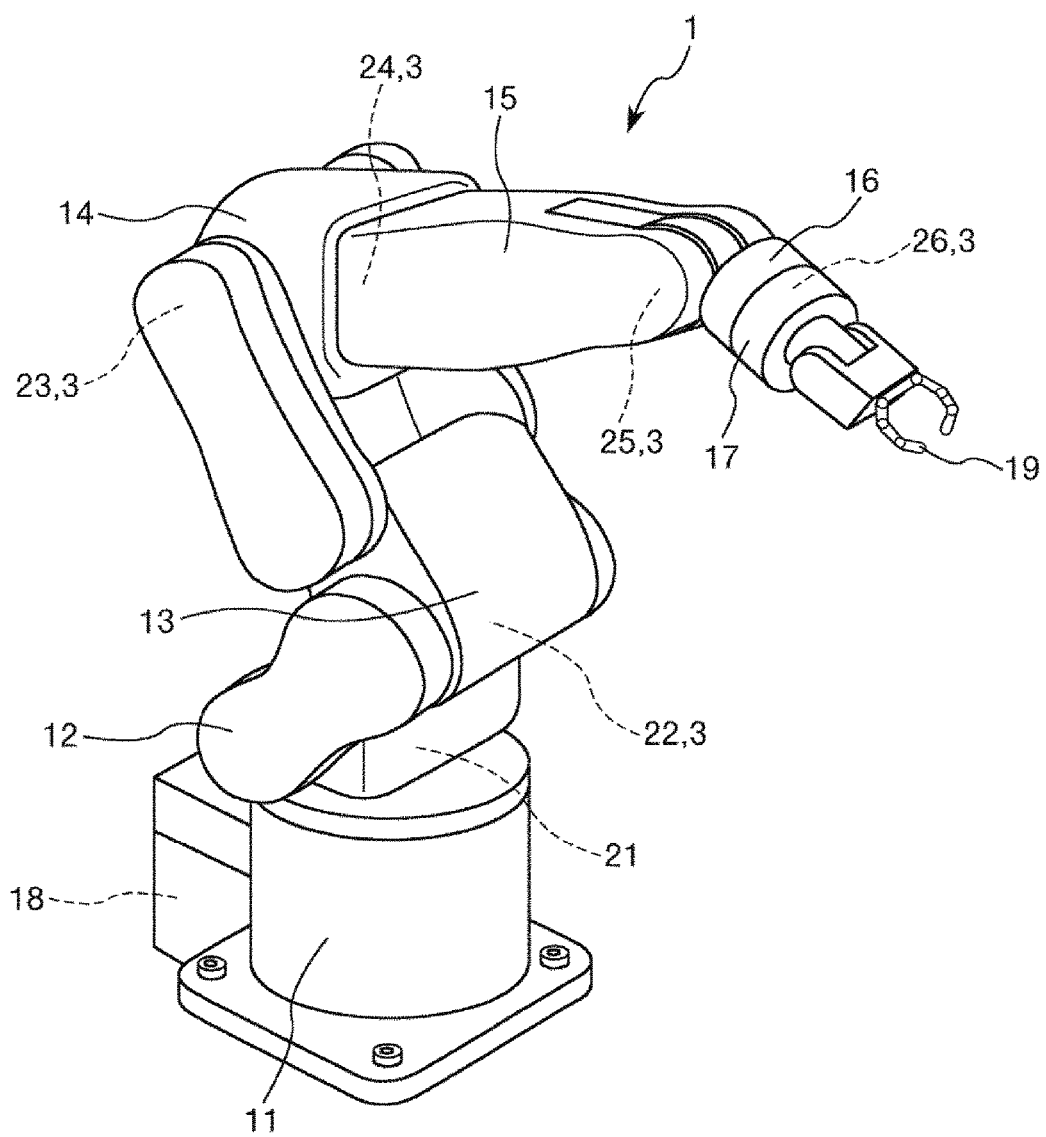
FIG. 1 is a perspective view illustrating a robot according to a first embodiment of the invention.
Figure 2:
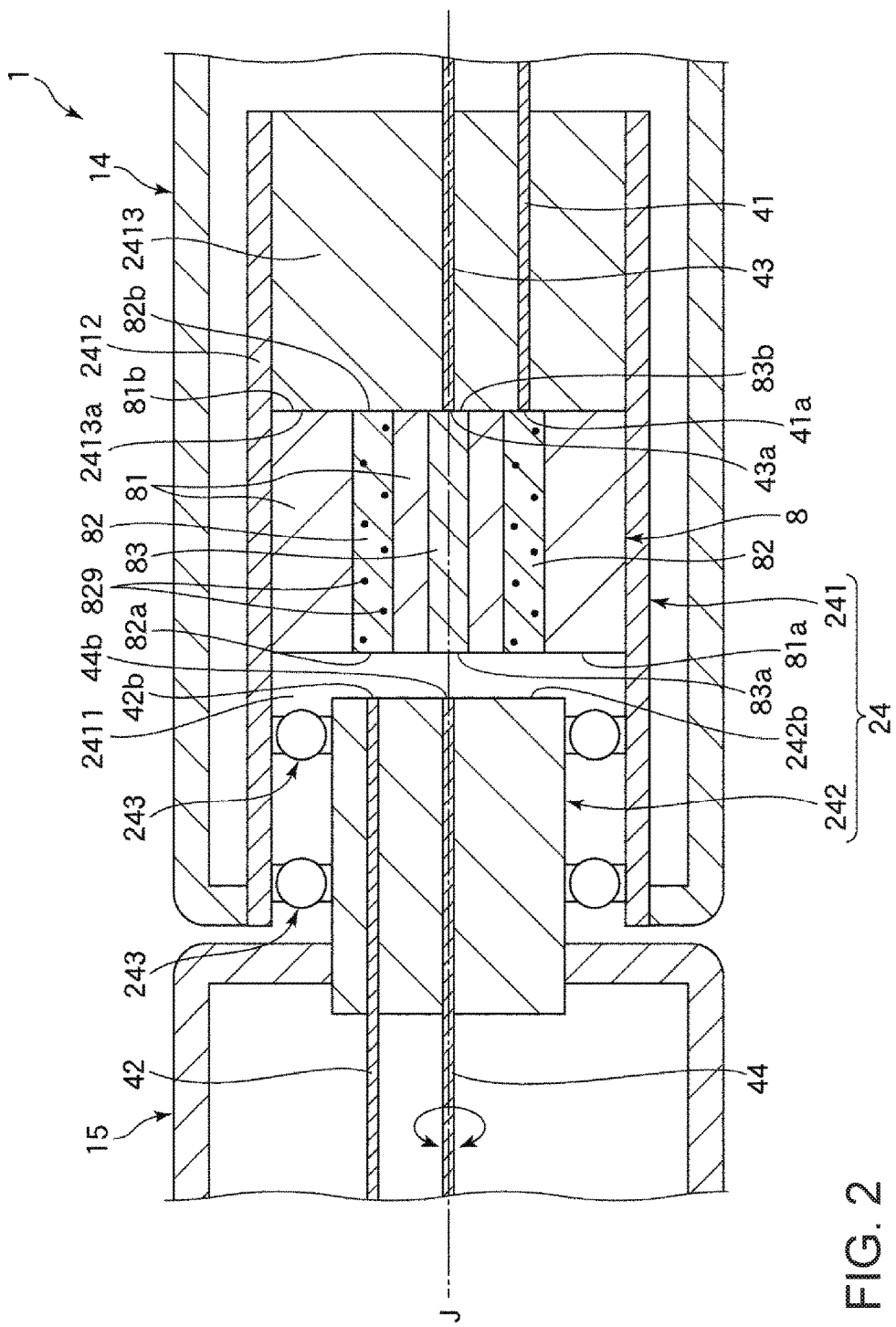
FIG. 2 is a sectional view illustrating a joint portion which is provided in the robot illustrated in FIG. 1.
Figure 3:
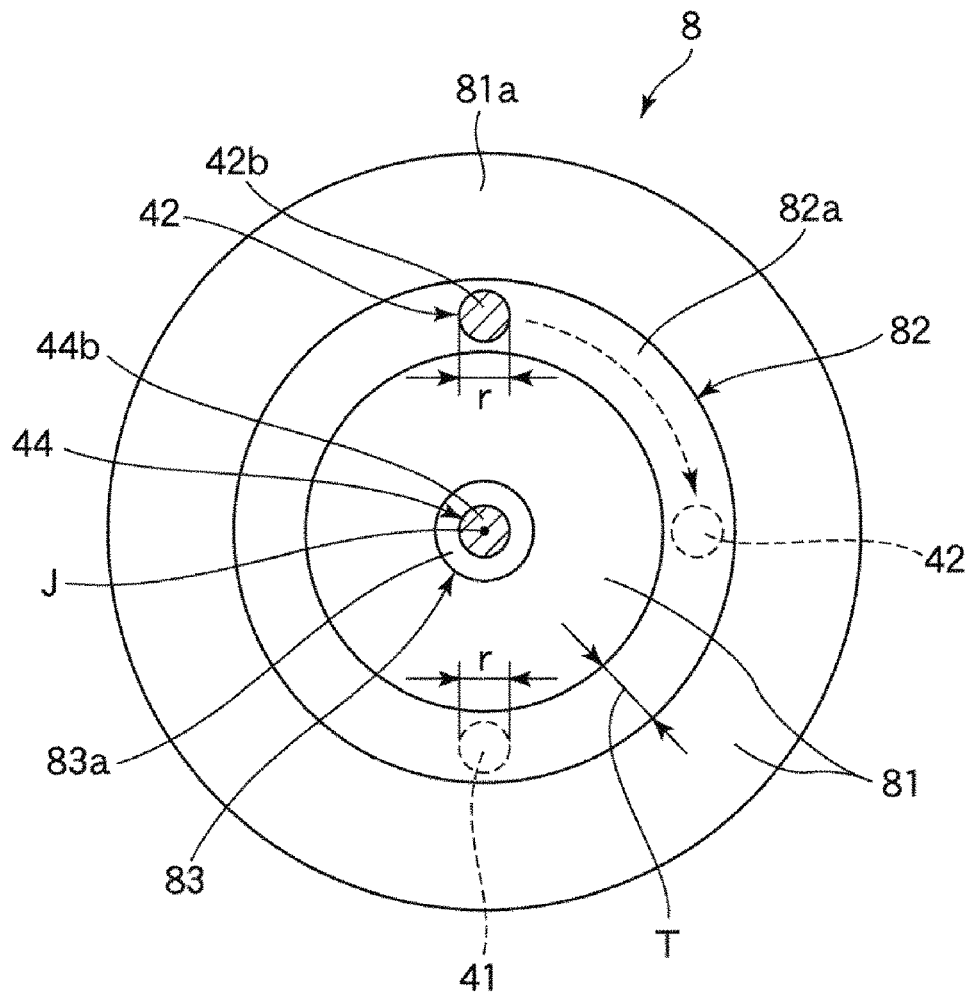
FIG. 3 is a front view of a light rotary joint illustrated in FIG. 2.
Figure 4:
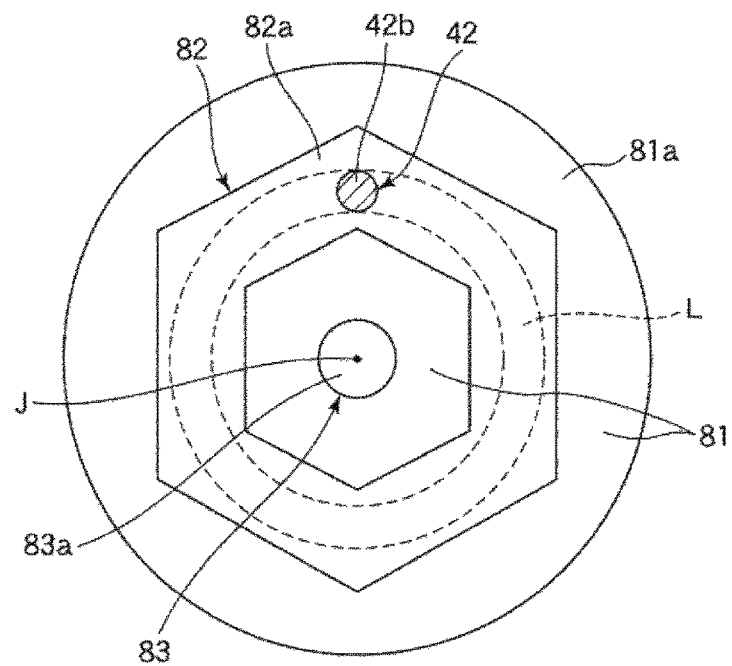
FIG. 4 is a front view illustrating a modification example of the light rotary joint illustrated in FIG. 3.
Figure 5:
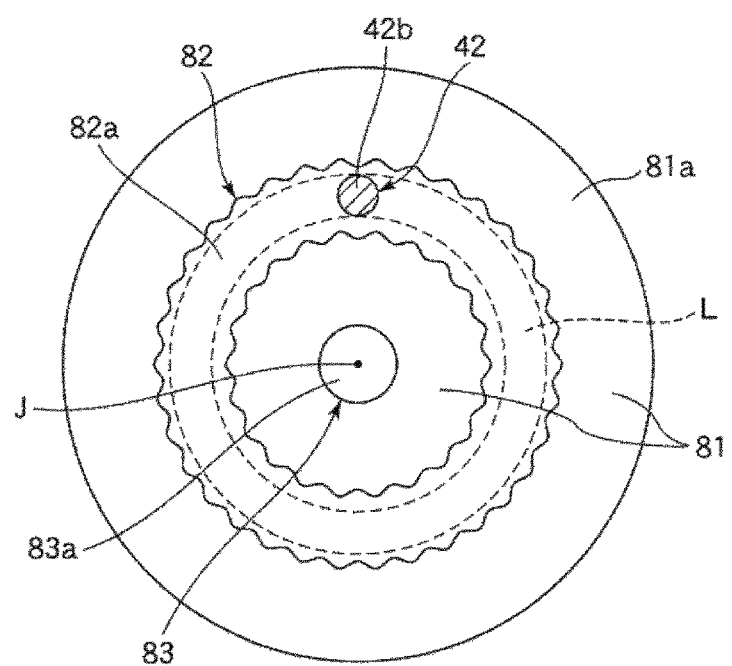
FIG. 5 is a front view illustrating a modification example of the light rotary joint illustrated in FIG. 3.
Figure 6:
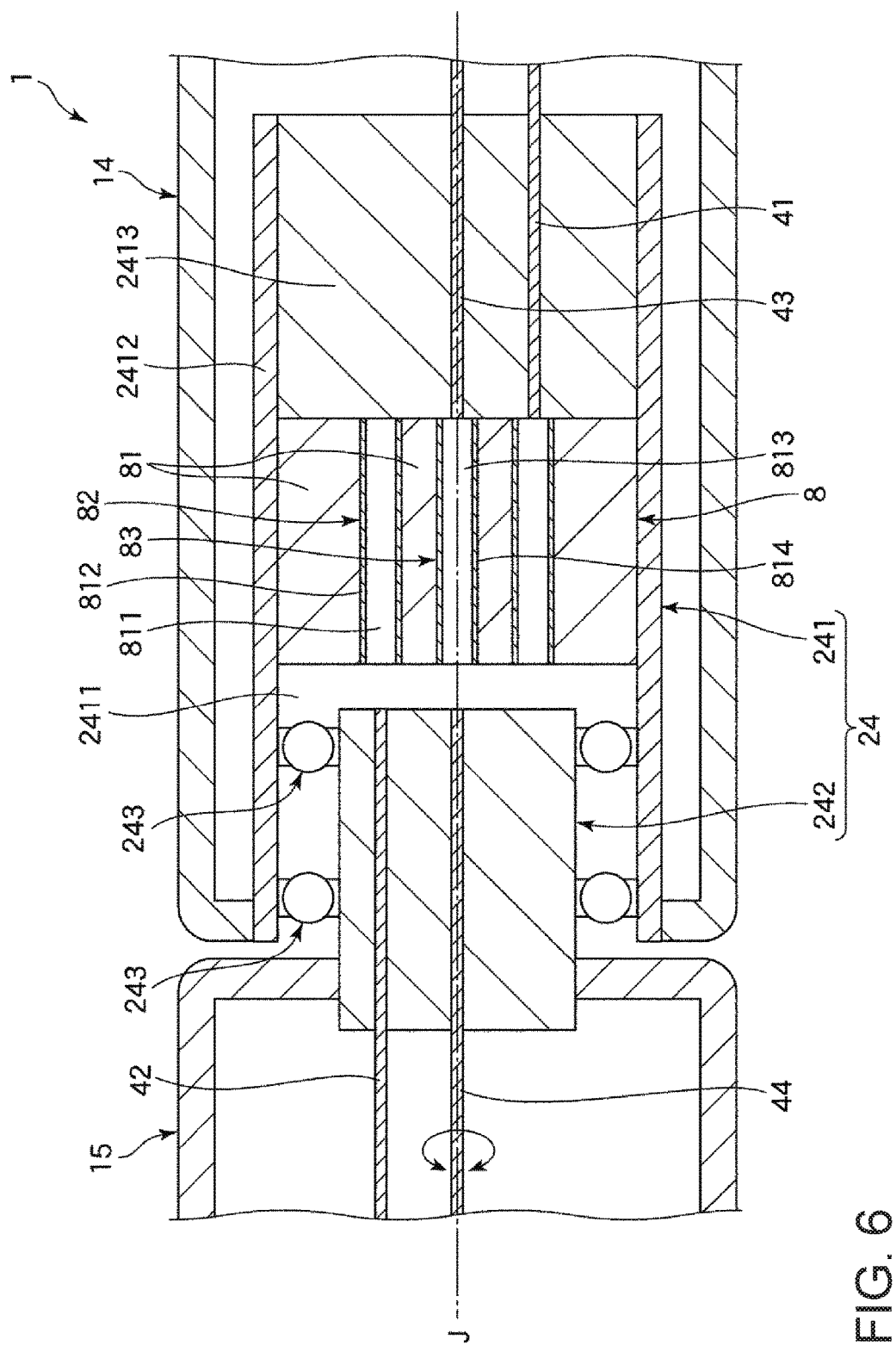
FIG. 6 is a sectional view illustrating a modification example of the light rotary joint illustrated in FIG. 3.
Figure 7:
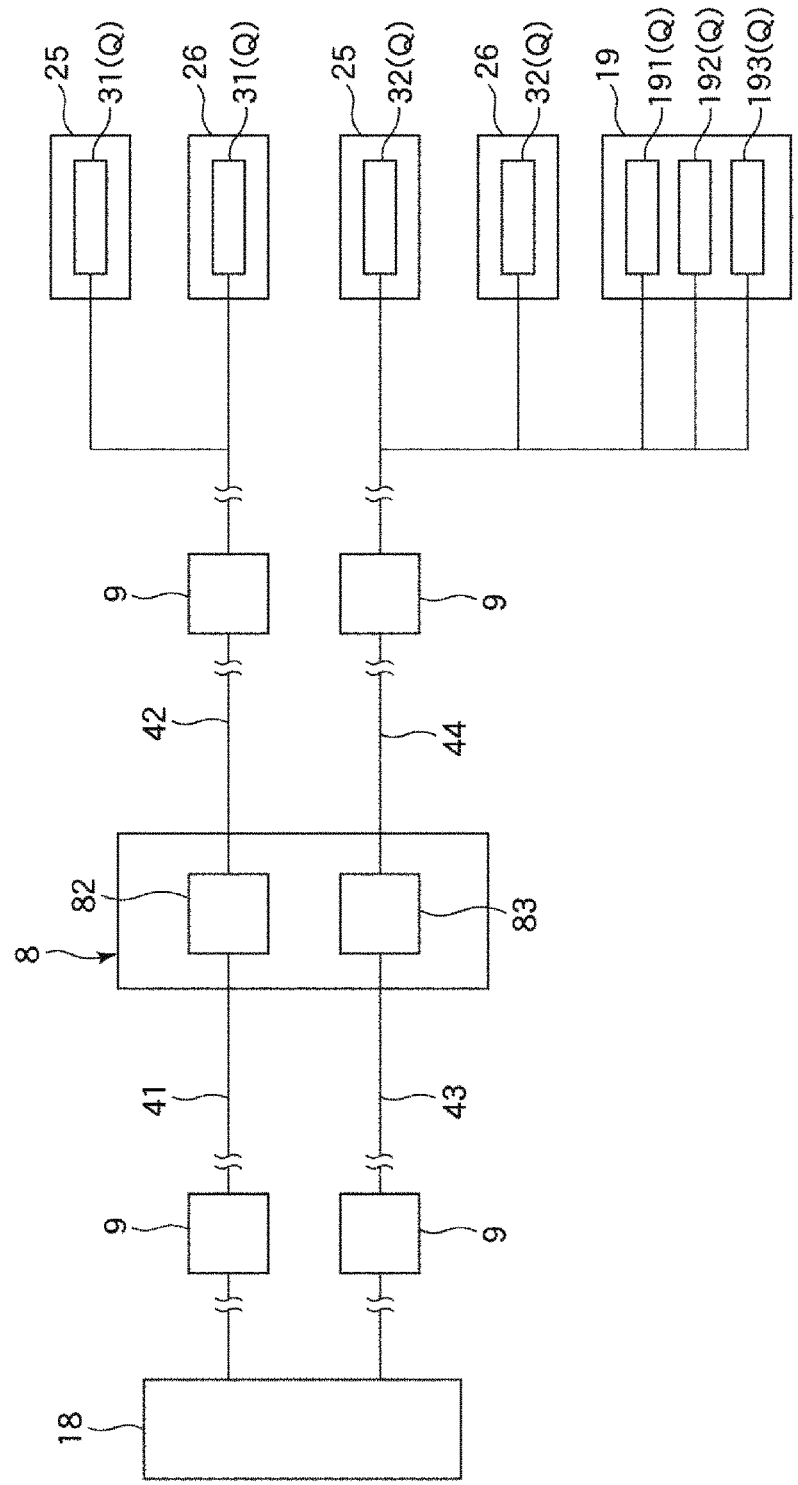
FIG. 7 is a block diagram illustrating an optical connection state of the robot illustrated in FIG. 1.

FIG. 1 is a perspective view illustrating a robot according to a first embodiment of the invention. FIG. 2 is a sectional view illustrating a joint portion which is provided in the robot illustrated in FIG. 1. FIG. 3 is a front view of a light rotary joint illustrated in FIG. 2. FIG. 4 and FIG. 5 are front views illustrating modification examples of the light rotary joint illustrated in FIG. 3. FIG. 6 is a sectional view illustrating a modification example of the light rotary joint illustrated in FIG. 3. FIG. 7 is a block diagram illustrating an optical connection state of the robot illustrated in FIG. 1. Hereinafter, for the convenience of explanation, a left side of FIG. 2 and FIG. 6 is also referred to as the "distal end" and a right side thereof is also called "proximal end".

The Robot 1 illustrated in FIG. 1 can perform operations such as material feeding, material removal, transportation, and assembly of a precision instrument and a component (object) constituting the precision instrument.

The robot 1 is a six-axis robot (a multi-joint robot) and has a base 11 which is fixed to a floor or a ceiling, an arm 12 which is rotatably connected to the base 11 via a joint portion 21, an arm 13 which is rotatably connected to the arm 12 via a joint portion 22, an arm 14 which is rotatably connected to the arm 13 via a joint portion 23, an arm 15 which is rotatably connected to the arm 14 via a joint portion 24, an arm 16 which is rotatably connected to the arm 15 via a joint portion 25, an arm 17 which is rotatably connected to the arm 16 via a joint portion 26, and a robot controller 18 which controls driving of the arms 12, 13, 14, 15, 16, and 17. In addition, a hand connection portion is provided in the arm 17 and a hand 19 (end effector) is mounted on the hand connection portion according to an operation performed by the robot 1. In addition, the driving device 3 which includes a motor, a controller which controls the driving of the motor, a speed reducer, an encoder or the like, for example, is mounted on each of the joint portions 21, 22, 23, 24, 25, and 26 and each of the arms 12, 13, 14, 15, 16, and 17 is rotated by the driving of driving devices 3. Each of the driving devices 3 is controlled by the robot controller 18.

Next, the configuration of the joint portion 24 will be described in detail. The structure of the joint portion 24 illustrated below can be also applied to other joint portions 21, 22, 23, 25, and 26. In other words, At least one of the joint portions 21, 22, 23, 24, 25, and 26 may have the following configuration.

As illustrated in FIG. 2, the joint portion 24 includes a main body portion 241 which is fixed to a distal end of the arm 14 and a rotation portion 242 which is fixed to the proximal end portion of the arm 15 and can rotate about a rotation axis J with respect to the main body portion 241.

The main body portion 241 has a circular columnar recessed portion 2411 which opens to a distal end side (arm 15 side) thereof. The main body portion 241 is formed by a tubular portion 2412 having a circular columnar through hole, an insertion portion 2413 which is inserted into and fixed to a proximal end portion of the tubular portion 2412 and thus the recessed portion 2411 is formed in the main body portion. However, the configuration of the main body portion 241 is not particularly limited, and the tubular portion 2412 and the insertion portion 2413 may be integrally formed as the main body portion 241, for example.

Here, the first light guide path 41 and the third light guide path 43 for transmitting light are routed in the arm 14. In addition, both first light guide path 41 and third light guide path 43 are provided to pass through the insertion portion 2413 and both distal end surface 41a of the first light guide path 41 and distal end surface 43a of the third light guide path 43 are exposed from a distal end surface 2413a (bottom surface of recessed portion 2411) of the insertion portion 2413. In addition, the distal end surface 41a of the first light guide path 41 is positioned at a position deviated from the rotation axis J and the distal end surface 43a of the third light guide path 43 is positioned on the rotation axis J, in a plan view seen in the axial direction of the rotation axis J.

As described above, the first light guide path 41 and the second light guide path 43 are not particularly limited as long as light can be transmitted, for example, an optical fiber can be used as the first light guide path 41 and the third light guide path 43. The proximal ends of the first and third light guide paths 41 and 43 are connected to a photoelectric conversion circuit 9 and further electrically connected to the object (for example, robot controller 18) via the photoelectric conversion circuit 9 (see FIG. 7). Although the disposition of the photoelectric conversion circuit 9 is not particularly limited, it is preferable to dispose the photoelectric conversion circuit 9 in the vicinity of the object (for example, a case where object is robot controller 18, in base 11).

On the other hand, the proximal end portion of the rotation portion 242 is inserted into the recessed portion

2411. In addition, the proximal end surface 242*b* (end surface on insertion portion 2413 side) of the rotation portion 242 is spaced apart from the distal end surface 2413*a* of the insertion portion 2413 and the light rotary joint 8 to be described below is disposed between the proximal end surface 242*b* and the distal end surface 2413*a*. In addition, the rotation portion 242 is connected to the tubular portion 2412 via a ball bearing 243. Accordingly, the rotation portion 242 is rotatably supported by the main body portion 241 and the rotation portion 242 can be smoothly rotated with respect to the main body portion 241.

Here, the second light guide path 42 and the fourth light guide path 44 for transmitting light are routed in the arm 15. In addition, both second light guide path 42 and fourth light guide path 44 are provided to pass through the rotation portion 242 and both proximal end surface 42*b* of the second light guide path 42 and proximal end surface 44*b* of the fourth light guide path 44 are exposed from the proximal end surface 242*b* of the rotation portion 242. In addition, The proximal end surface 42*b* of the second light guide path 42 is positioned at a position deviated from the rotation axis J and the proximal end surface 44*b* of the fourth light guide path 44 is positioned on rotation axis J, in a plan view seen in the axial direction of the rotation axis J.

As described above, the second light guide path 42 and the fourth light guide path 44 are not particularly limited as long as light can be transmitted, and in the same manner as the first and third light guide paths 41 and 43 described above, the optical fiber can be used as the second light guide path 42 and the fourth light guide path 44, for example. The distal ends of the second and fourth light guide paths 42 and 44 are connected to the photoelectric conversion circuit 9 and are further electrically connected to the object (for example, driving device 3 of joint portions 25 and 26, a camera of the hand 19, various sensors, or the like) via the photoelectric conversion circuit 9 (see FIG. 7). Although the disposition of the photoelectric conversion circuit 9 is not particularly limited, it is preferable that the photoelectric conversion circuit 9 is disposed near the object (for example, in the same arm as the arm on which the object is disposed).

As described above, the construction of the joint portion 24 is described. In the present embodiment, the main body portion 241 has an outer diameter more than the rotation portion 242 and has a weight more than that thereof. Therefore, the main body portion 241 is fixed to the arm 14 so as to position the main body portion 241 on a root side of the robot 1 (base 11 side). Accordingly, the distal end size of the robot 1 can be miniaturized and the weight of the robot 1 can be reduced so that the robot 1 has better driving characteristics. However, the disposition of the joint portion 24 may be reversed described above.

The constituent materials of the main body portion 241 and the rotation portion 242 are not particularly limited and for example, various metals such as iron, nickel, cobalt, copper, manganese, aluminum, magnesium, zinc, lead, tin, titanium, and tungsten, alloys (for example, stainless steel) containing at least one type of these metals or an intermetallic compound, as well as oxides (for example, alumina), nitrides, carbides of these metals, and the like can be used as the constituent materials thereof.

As illustrated in FIG. 2, the light rotary joint 8 is disposed in the joint portion 24. The light rotary joint 8 has a function which can perform an optical communication between the first light guide path 41 and the second light guide path 42 and an optical communication between the third light guide path 43 and the fourth light guide path 44 via the joint portion 24. Hereinafter, the light rotary joint 8 will be described in detail.

The light rotary joint 8 is disposed in the tubular portion 2412 and is positioned between the insertion portion 2413 and the rotation portion 242. In addition, the light rotary joint 8 has a base portion 81 fixed to the main body portion 241 and a first light guide portion 82 and a second light guide portion 83 provided so as to pass through the base portion 81. The second light guide portion 83 is formed in a circular column shape about the rotation axis J and the first light guide portion 82 is formed in a cylindrical shape so as to surround the second light guide portion 83 about the rotation axis J and while being in non-contact with the second light guide portion 83. As described above, in the light rotary joint 8, since the base portion 81 functions as cladding and the first light guide portion 82 and the second light guide portion 83 function as a core, the light can be transmitted in the first light guide portion 82 and the second light guide portion 83. In particular, since the base portion 81 functioning as cladding is present between the first light guide portion 82 and the second light guide portion 83, crosstalk (contamination) is prevented from being generated between the first light guide portion 82 and the second light guide portion 83.

The proximal end surface 81*b* of the base portion 81 is abutted against the distal end surface 2413*a* of the insertion portion 2413. In addition, the distal end surface 81*a* of the base portion 81 is spaced apart from the proximal end surface 242*b* of the rotation portion 242. In addition, the distal end surface 81*a* and the proximal end surface 242*b* face each other with a gap therebetween. Accordingly, frictional resistance can be reduced when the rotation portion 242 rotates with respect to the main body portion 241 and the rotation portion 242 can be more smoothly rotated with respect to the main body portion 241. In addition, wear (damage due to friction) of the distal end surfaces 82*a* and 83*a* of the first and second light guide portions 82 and 83 and the proximal end surfaces 42*b* and 44*b* of the second and fourth light guide paths 42 and 44 can be prevented and a decrease in the light propagation efficiency of the light rotary joint 8 can be suppressed.

Although a separation distance between the distal end surface 81*a* of the base portion 81 and the proximal end surface 242*b* of the rotation portion 242 is not particularly limited, the separation distance is preferably as small as possible. Specifically, the separation distance is preferably 5 mm or less, more preferably 3 mm or less, and further preferably 1 mm or less. Accordingly, a reduction in light propagation efficiency between the second and fourth light guide paths 42 and 44 and the light rotary joint 8 can be suppressed.

For example, a matching oil which satisfies predetermined optical conditions and does not substantially hinder light propagation may be filled in the gap between the distal end surface 81*a* of the base portion 81 and the proximal end surface 242*b* of the rotation portion 242. Accordingly, since the distal end surface 81*a* and the proximal end surface 242*b* are blocked from the outside air, deterioration of the portion can be suppressed. The configuration of the portion is not particularly limited and for example, the distal end surface 81*a* and the proximal end surface 242*b* may be in contact with each other.

The first light guide portion 82 optically connects the first light guide path 41 and the second light guide path 42 to each other. The first light guide portion 82 is substantially colorless and transparent and has a higher refractive index than the base portion 81. Therefore, the light incident on the first light guide portion 82 propagates in a state of being trapped in the first light guide portion 82 while being totally reflected. As described above, the first light guide portion 82 has a cylindrical shape about the rotation axis J.

In addition, the distal end surface 82a of the first light guide portion 82 is positioned on a plane perpendicular to the rotation axis J and the entire region thereof is exposed from the distal end surface 81a of the base portion 81. The distal end surface 82a faces the proximal end surface 42b of the second light guide path 42. In other words, as illustrated in FIG. 3, the distal end surface 82a of the first light guide portion 82 and the proximal end surface 42b of the second light guide path 42 overlap each other in a plan view seen in the axial direction of the rotation axis J. Therefore, the light emitted from the distal end surface 82a of the first light guide portion 82 is more reliably incident on the proximal end surface 42b of the second light guide path 42 and, in addition, the light emitted from the proximal end surface 42b of the second light guide path 42 is more reliably incident on the distal end surface 82a of the first light guide portion 82. Since the first light guide portion 82 has a cylindrical shape about the rotation axis J, even when both second light guide path 42 and rotation portion 242 rotate about the rotation axis J, a state where the distal end surface 82a of the first light guide portion 82 and the proximal end surface 42b of the second light guide path 42 face each other is always maintained. Therefore, regardless of a rotation state of the rotation portion 242, the first light guide portion 82 and the second light guide path 42 can be optically connected.

In addition, as illustrated in FIG. 2, the proximal end surface 82b of the first light guide portion 82 is also positioned on a plane perpendicular to the rotation axis J and the entire region thereof is exposed from the proximal end surface 81b of the base portion 81. In addition, the proximal end surface 82b is connected to the distal end surface 41a of the first light guide path 41 at a portion thereof. Therefore, the light emitted from the proximal end surface 82b of the first light guide portion 82 is more reliably incident on the distal end surface 41a of the first light guide path 41 and, in addition, the light emitted from the distal end surface 41a of the first light guide path 41 is more reliably incident on the proximal end surface 82b of the first light guide portion 82. Thereby, the first light guide portion 82 and the first light guide path 41 can be optically connected to each other.

As described above, the first light guide portion 82 is optically connected to the second light guide path 42 on the distal end side thereof and optically connected to the first light guide path 41 on the proximal end side thereof. Therefore, optical communication between the first light guide path 41 and the second light guide path 42 can be performed via the first light guide portion 82.

As illustrated in FIG. 3, in the present embodiment, although the thicknesses T (difference between outer diameter and inner diameter) of the first light guide portion 82 are more than the diameters r of the first light guide path 41 and the second light guide path 42, the thicknesses T thereof is not limited thereto and may be equal to the diameters r or less than the diameters r.

In addition, the first light guide portion 82 can be optically connected to the second light guide path 42 on the distal end side thereof and as long as the first light guide portion 82 can optically connect with the first light guide path 41, the first light guide portion 82 is not particularly limited on the proximal end side thereof, regardless of the rotation state of the rotation portion 242. For example, as long as at least the distal end surface 82a of the first light guide portion 82 is annular about the rotation axis J, the shape of the other portion thereof is not particularly limited. In addition, as long as the distal end surface 82a always faces the proximal end surface 42b of the second light guide path 42, that is, as long as the distal end surface 82a overlaps with the movement locus L of the proximal end surface 42b of the second light guide path 42 over the entire circumference in a plan view seen in the axial direction of the rotation axis J while the rotation portion 242 makes one rotation about the rotation axis J, the distal end surface 82a may not have an annular shape about the rotation axis J. For example, as illustrated in FIG. 4, the distal end surface 82a may have a polygonal annular shape about the rotation axis J or may be an annular shape which draws a circle while meandering about the rotation axis J, as illustrated in FIG. 5. Further, as long as the distal end surface 82a of the first light guide portion 82 is always optically connected to the second light guide path 42 while the rotation portion 242 makes one rotation about the rotation axis J, the distal end surface 82a and the proximal end surface 42b of the second light guide path 42 may not face each other.

In addition, although the base portion 81 functions as cladding in the present embodiment, the base portion 81 is not limited thereto and the first light guide portion 82 may be configured to have a core and cladding. Accordingly, a selection freedom degree of the constituent material of the base 81 increases. In addition, as illustrated in FIG. 6, the first light guide portion 82 may be configured to have a through hole 811 which is formed in the base portion 81 and a reflective film 812 which is disposed on an inner circumferential surface of the through hole 811 and has light reflectivity. In a case where the inner circumferential surface of the through hole 811 has light reflectivity, the reflective film 812 can be omitted.

Similarly to the first light guide portion 82, the second light guide portion 83 also has a function (function of allowing light to pass through) of propagating light from the distal end side to the proximal end side thereof or from the proximal end side to the distal end side thereof. The second light guide portion 83 is substantially colorless and transparent and has a higher refractive index than the base portion 81. Therefore, the light incident on the second light guide portion 83 is propagated in a state of being trapped in the second light guide portion 83 while being totally reflected. As illustrated in FIG. 2, as described above, the second light guide portion 83 has a circular column shape extending along the rotation axis J, that is, a circular column shape about the rotation axis J.

The distal end surface 83a of the second light guide portion 83 is exposed from the distal end surface 81a of the base portion 81. The distal end surface 83a faces the proximal end surface 44b of the fourth light guide path 44. In other words, as illustrated in FIG. 3, the distal end surface 83a of the second light guide portion 83 and the proximal end surface 44b of the fourth light guide path 44 overlap each other in a plan view seen in the axial direction of the rotation axis J. Therefore, the light emitted from the distal end surface 83a of the second light guide portion 83 is more reliably incident on the proximal end surface 44b of the fourth light guide path 44 and, in addition, the light emitted from the proximal end surface 44b of the fourth light guide path 44 is more reliably incident on the distal end surface 83a of the second light guide portion 83.

In addition, as illustrated in FIG. 2, the proximal end surface 83b of the second light guide portion 83 is exposed from the proximal end surface 81b of the base portion 81. The proximal end surface 83b is connected to the distal end surface 43a of the third light guide path 43. Therefore, the light emitted from the proximal end surface 83b of the second light guide portion 83 is more reliably incident on the distal end surface 43a of the third light guide path 43 and, in addition, the light emitted from the distal end surface 43a of the third light guide path 43 is more reliably incident on the proximal end surface 83b of the second light guide portion 83. Accordingly, the second light guide portion 83 and the third light guide path 43 can be optically connected to each other.

As described above, the second light guide portion 83 is optically connected to the fourth light guide path 44 on the distal end side thereof and optically connected to the third light guide path 43 on the proximal end side thereof. Therefore, optical communication between the third light guide path 43 and the fourth light guide path 44 can be performed via the second light guide portion 83.

In the present embodiment, although the diameter of the second light guide portion 83 is more than the diameters of the third and fourth light guide paths 43 and 44, the diameter thereof is not limited thereto, and the diameter thereof may be equal to those of the third and fourth light guide paths 43 and 44 or may be less than those of the third and fourth light guide paths 43, 44.

In addition, as long as the second light guide portion 83 can be optically connected to the fourth light guide path 44 on the distal end side thereof and can be optically connected to the third light guide path 43 on the proximal end side thereof, the shape of the second light guide portion 83 is not limited thereto. For example, the sectional shape of the second light guide portion 83 may not be circular but may be a polygon such as an ellipse, a triangle, and a quadrangle, an irregular shape, or the like. In addition, the second light guide portion 83 may be curved or bent in the middle of the extending direction thereof.

In addition, in the present embodiment, although the base portion 81 is configured to function as cladding, the base portion 81 is not limited thereto, and the second light guide portion 83 may be configured to have a core and cladding. Accordingly, a selection freedom degree of the constituent material of the base 81 increases. In addition, for example, as illustrated in FIG. 6, the second light guide portion 83 may be configured to have a through hole 813 which is formed on the base portion 81, a reflective film 814 which is disposed on the inner circumferential surface of the through hole 813 and has light reflectivity. In a case where the inner circumferential surface of the through hole 813 has the light reflectivity, the reflective film 814 can be omitted.

As described above, the second light guide portion 83 may be omitted both third light guide path 43 and fourth light guide path 44.

As described above, as the constituent materials of the base 81, the first light guide portion 82 and the second light guide portion 83, as described above, as long as the refractive indices of the first and second light guide portions 82 and 83 are set to be more than that of the base portion 81, constituent materials thereof are not particularly limited thereto and can use various resin materials such as acrylic resin, methacrylic resin, polycarbonate, polystyrene, cyclic ether type resin such as epoxy type resin and oxetane type resin, polyamide, polyimide, polybenzoxazole, polysilane, Polysilazane, silicone resin, fluorine resin, polyurethane, polyolefin resin, polybutadiene, polyisoprene, polychloroprene, polyesters such as PET and PBT, polyethylene succinate, polysulfone, polyether, or cyclic olefin resin such as benzocyclobutene type resin and norbornene type resin, various glass materials such as quartz glass and borosilicate glass and may be a composite material that combines at least two different materials, for example.

In addition, as illustrated in FIG. 2, a diffusion material 829 for diffusing light is dispersed in the first light guide portion 82. In other words, the first light guide portion 82 includes a diffusion material 829 for diffusing light. Accordingly, the light can be diffused in the first light guide portion 82, the light incident from the distal end surface 82a can be more reliably guided to the proximal end surface 82b, and, in addition, the light incident from the proximal end surface 82b can be more reliably guided to the distal end surface 82a. In other words, the loss of light in the first light guide portion 82 can be effectively reduced. The constituent material of the diffusion material 829 is not particularly limited and can use a resin material (for example, various resin materials described above) having a refractive index different from that of the constituent material of the first light guide portion 82, bubbles, metal scales, or the like, for example. However, the diffusion material 829 may be omitted.

The light rotary joint 8 is described above. As described above, the light rotary joint 8, since at least a portion of the electric wiring as in the related art can be replaced with the optical wiring, the number of the electric wiring passing through the joint portion 24 can be reduced. Therefore, the joint portion 24 can be miniaturized. In addition, since the optical wiring (the first, second, third, and fourth light guide paths 41, 42, 43, and 44) is not twisted also due to the rotation of the joint portion 24, the damage of the optical wiring or the deterioration of the light propagation efficiency due to excessive deformation of the optical wiring is suppressed and thus the reliability of the robot 1 is improved.

In particular, in the present embodiment, since the first light guide path 41 and the second light guide path 42 are optically connected to each other by the first light guide portion 82 and the third light guide path 43 and the fourth light guide path 44 are optically connected to each other by the second light guide portion 83, two optical communication paths are formed. Therefore, bi-directional communication can be performed.

In addition, in the light rotary joint 8, the light guide efficiency of the first light guide portion 82 is less than that of the second light guide portion 83 due to configuration thereof. Therefore, for example, it is preferable that the signal having stronger signal strength of the two optical signals is communicated via the first light guide portion 82 and the signal having weaker signal strength is communicated via the second light guide portion 83. In addition, it is preferable that the signal which is further important of the two optical signals is communicated via the second light guide portion 83 and the signal which is not important thereof is communicated via the first light guide portion 82.

By way of specific example, for example, as illustrated in FIG. 7, it is preferable that a signal (control signal) transmitted from the robot controller 18 to the controller 31 of the driving device 3 provided in the joint portion 25 and the joint portion 26 is transmitted via the first light guide portion 82 and output signals from an encoder 32 of the driving device 3 provided in the joint portion 25 or the joint portion 26, an encoder 191, a camera 192, various sensors 193 (force sensor, temperature sensor, pressure sensor, or the like), or the like provided in the hand 19 is transmitted to the robot controller 18 via the second light guide portion 83. This is because it is relatively easy for the control signal to be generated in consideration of the loss in the first light guide portion 82 with respect to the output signal. In the following description, the encoders 32 and 191, the camera 192, and the various sensors 193 are collectively referred to as an electronic component Q. In addition, the electronic component Q is not limited thereto.

Here, as illustrated in FIG. 7, in a case where the second and fourth light guide paths 42 and 44 are connected to the plurality of electronic components Q, and for example, the output signals may be transmitted in a time division manner from each electronic component.

The robot 1 is described above. As described above, such a robot 1 includes the arm 14 as a first arm which has the first light guide path 41, the arm 15 as a second arm which has the second light guide path 42, the joint portion 24 that has the rotation axis J and connects the arm 14 and the arm 15 to each other so as to be rotatable about the rotation axis J, and the light rotary joint 8 which is provided between the first light guide path 41 and the second light guide path 42 inside the joint portion 24 and optically connects the first light guide path 41 and the second light guide path 42 to each other. Accordingly, since at least a portion of the electric wiring as in the related art can be replaced with the optical wiring, the number of the electric wiring passing through the joint portion 24 can be reduced. Therefore, the joint portion 24 can be miniaturized. In addition, since the optical wiring (first and second light guide paths 41 and 42) is not twisted due to the rotation of the joint portion 24, the damage of the optical wiring, decrease in the light propagation efficiency due to excessive deformation of the optical wiring is suppressed and thus reliability of the robot 1 is improved.

In addition, as described above, in the robot 1, the light rotary joint 8 is fixed to the first light guide path 41 and has a first light guide portion 82 in a tubular shape about the rotation axis J. In addition, an end portion (proximal end surface 42b) of the second light guide path 42 on the light rotary joint 8 side faces the first light guide portion 82. Accordingly, regardless of the rotation state of the arm 15, the first light guide path 41 and the second light guide path 42 can be optically connected via the first light guide portion 82.

In addition, as described above, the robot 1 has the third light guide path 43 disposed on the arm 14 as a first arm and the fourth light guide path 44 disposed in the arm 15 as the second arm. In addition, the light rotary joint 8 has the second light guide portion 83 which is disposed inside the first light guide portion 82 and optically connects the third light guide path 43 and the fourth light guide path 44 to each other. Accordingly, bi-directional optical communication becomes possible by using the first light guide portion 82 and the second light guide portion 83. Therefore, the convenience of the robot 1 is improved.

In addition, as described above, in the robot 1, the second light guide portion 83 is fixed to the third light guide path 43 and is disposed on the rotation axis J. An end portion (proximal end surface 44 b) of the fourth light guide path 44 on the light rotary joint 8 side faces the second light guide portion 83. Accordingly regardless of the rotation state of the arm 15, the third light guide path 43 and the fourth light guide path 44 can be optically connected via the second light guide portion 83.

In addition, as described above, the robot 1 has the electronic component Q which is disposed on the arm 15 side (distal end side of robot 1) than the joint portion 24 and is connected to the second light guide path 42 and the fourth light guide path 44. Accordingly, for example, the control signal to the electronic component Q and the output signal from the electronic component Q can be optically communicated via the light rotary joint 8. Therefore, the communication speed of these signals can increase and the robot 1 with higher accuracy can be realized.

Second Embodiment

Next, a robot according to a second embodiment of the invention will be described.

Figure 8:
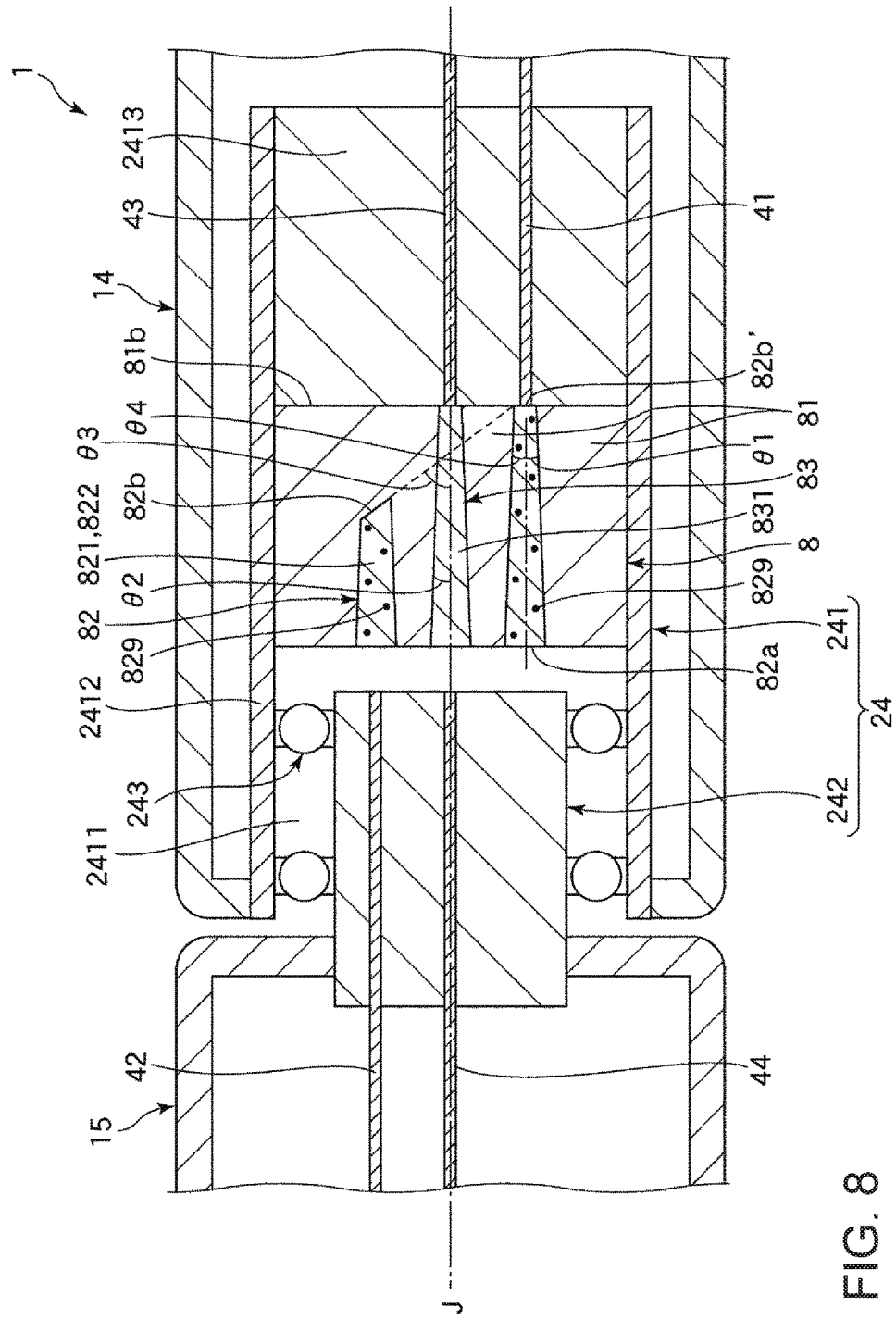
FIG. 8 is a sectional view illustrating a joint portion which is provided in a robot according to a second embodiment of the invention.
Figure 9:
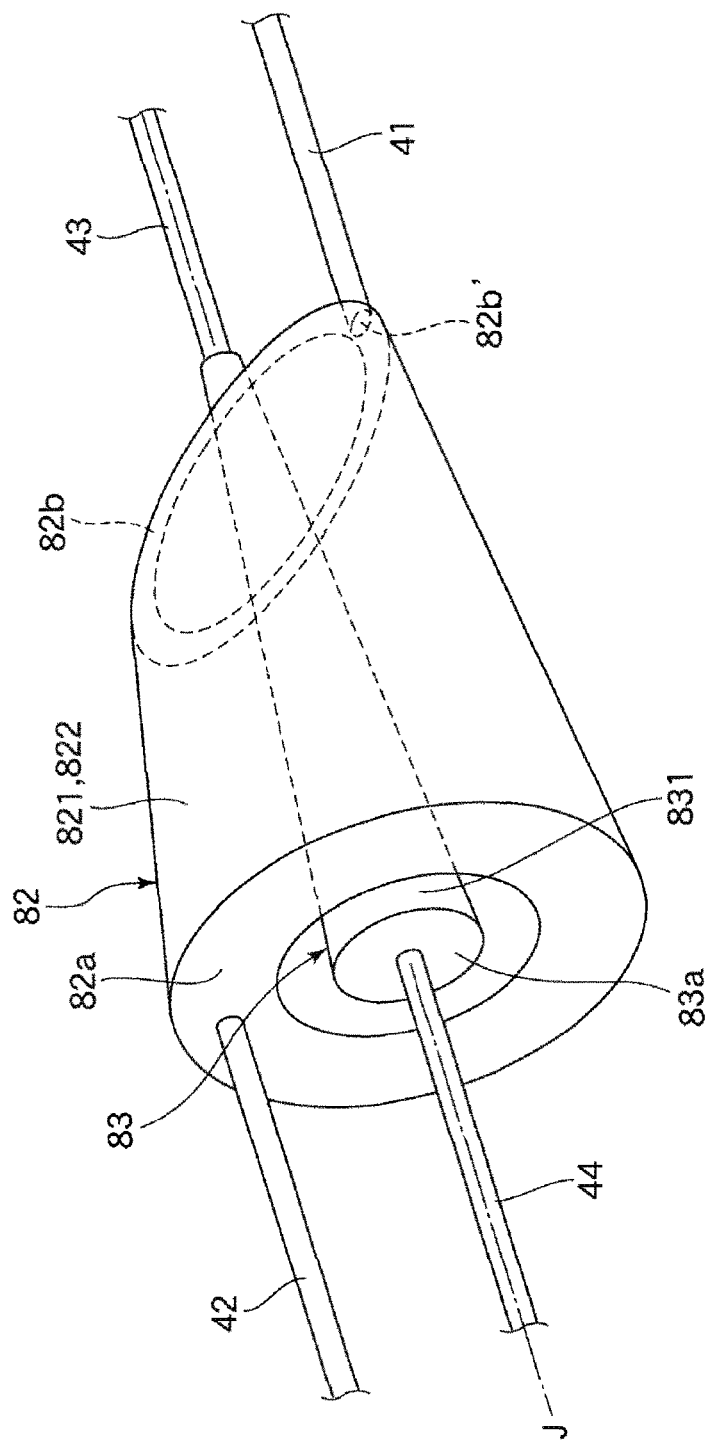
FIG. 9 is a perspective view of a light rotary joint illustrated in FIG. 8.

FIG. 8 is a sectional view illustrating the joint portion which is provided in the robot according to the second embodiment of the invention. FIG. 9 is a perspective view of the light rotary joint illustrated in FIG. 8.

The present embodiment is the same as the first embodiment described above except that the configuration of the light rotary joint 8 is different.

In the following description, contents related to the present embodiment and differences from the first embodiment described above will be mainly described and description of the same matters will be omitted. In addition, in FIG. 8 and FIG. 9, the same reference numerals are given to the same configurations as those in the embodiment described above.

As illustrated in FIG. 8, the proximal end surface 82b of the first light guide portion 82 is positioned on a plane inclined with respect to a plane perpendicular to the rotation axis J and a portion thereof is exposed from the proximal end surface 81b of the base portion 81. Hereinafter, the exposed portion is also referred to as an exposed portion 82b'. In addition, the exposed portion 82b' is positioned at a portion most distant from the distal end surface 82a of the proximal end surface 82b. The proximal end surface 82b is connected to the first light guide path 41 at the exposed portion 82b'.

In other words, as illustrated in FIG. 9, the first light guide portion 82 has a tubular shape (that is, oblique incision tubular shape) having a surface at which one end portion thereof obliquely intersects the rotation axis J. The exposed portion 82b' is positioned on the proximal end surface 82b of the portion having the longest length (axial length) and the exposed portion 82b' is connected to the first light guide path 41. By configuring the first light guide portion 82 in such a shape, the light incident from the distal end surface 82a can be more effectively guided to the exposed portion 82b' and, in addition, the light incident from the exposed portion 82b' can be more efficiently guided to the distal end surface 82a. Therefore, loss of light within the first light guide portion 82 can be effectively reduced.

Although the inclination angle θ3 of the proximal end surface 82b about the rotation axis J is not particularly limited, it is preferable that the inclination angle θ3 is more than the inclination angle θ1 which will be described below. Specifically, the inclination angle θ3 is preferably 20° or more or 45° or less and is more preferably 30° or more or 40° or less. Accordingly, more efficiently, the light incident from the distal end surface 82a can be more efficiently guided to the exposed portion 82b' and, in addition, the light incident from the exposed portion 82b' can be more efficiently guided to the distal end surface 82a.

In addition, the first light guide portion 82 has an outer diameter gradually decreasing portion 821 whose outside diameter gradually decreases from the second light guide path 42 side (distal end surface 82a side) toward the first light guide path 41 side (proximal end surface 82b side). Accordingly, the light incident from the distal end surface 82a can be more efficiently guided to the exposed portion 82b' and, in addition, the light incident from the exposed portion 82b' can be more efficiently guided to the distal end surface 82a. Therefore, the loss of light in the first light guide portion 82 can be effectively reduced.

Although the inclination angle θ1 of the outer diameter gradually decreasing portion 821 about the rotation axis J is not particularly limited, the inclination angle θ1 is preferably about 1° to 20° and more preferably 5° to 10°, for example. Accordingly, the effect described above becomes more remarkable.

In the present embodiment, although the entire region of the first light guide portion 82 in the length direction is configured by the outer diameter gradually decreasing portion 821, a portion of the first light guide portion 82 in the length direction may be configured by an outer diameter gradually decreasing portion 821 or the outer diameter gradually decreasing portion 821 may be omitted.

In addition, the first light guide portion 82 has an inner diameter gradually increasing portion 822 whose inner diameter gradually increases from the distal end surface 82a side toward the proximal end surface 82b side. Accordingly, the light incident from the distal end surface 82a can be more efficiently guided to the exposed portion 82b' and, in addition, the light incident from the exposed portion 82b' can be more efficiently guided to the distal end surface 82a. Therefore, the loss of light in the first light guide portion 82 can be effectively reduced.

Although the inclination angle θ4 of the inner diameter gradually increasing portion 822 about the rotation axis J is not particularly limited, the inclination angle θ4 is preferably about 1° to 20° and more preferably 5° to 10°, for example. Accordingly, the effect described above becomes more remarkable.

In the present embodiment, although the entire region of the first light guide portion 82 in the length direction is configured by the inner diameter gradually increasing portion 822, a portion of the first light guide portion 82 in the length direction is configured by the inner diameter gradually increasing portion 822 or the inner diameter gradually increasing portion 822 may be omitted.

In addition, the second light guide portion 83 has an outer diameter gradually decreasing portion 831 whose outside diameter gradually decreases from the fourth light guide path 44 side (distal end surface 83a side) toward the third light guide path 43 side (proximal end surface 83b side). Accordingly, the light incident from the distal end surface 83a can be more efficiently guided to the proximal end surface 83b and, in addition, the light incident from the proximal end surface 83b can be more efficiently guided to the distal end surface 83a. Therefore, the loss of light in the second light guide portion 83 can be effectively reduced.

Although the inclination angle θ2 of the outer diameter gradually decreasing portion 831 about the rotation axis J is not particularly limited, the inclination angle θ2 is preferably about 1° to 20° and more preferably 5° to 10°, for example. Accordingly, the effect described above becomes more remarkable.

In the present embodiment, although the entire region of the second light guide portion 83 in the length direction is configured by the outer diameter gradually decreasing portion 831, a portion of the second light guide portion 83 in the length direction may be configured by the outer diameter gradually decreasing portion 831 or the outer diameter gradually decreasing portion 831 may be omitted.

The light rotary joint 8 of the present embodiment is described above. As described above, In the light rotary joint 8, due to the configuration of the first light guide portion 82, the light propagation efficiency from the first light guide path 41 to the second light guide path 42 is less than that from the second light guide path 42 to the first light guide path 41. On the other hand, in the second light guide portion 83, the light propagation efficiency from the fourth light guide path 44 to the third light guide path 43 is substantially equal to that from the third light guide path 43 to the fourth light guide path 44. Therefore, in the present embodiment, the first light guide portion 82 is used for transmitting a signal from the second light guide path 42 to the first light guide path 41 and the second light guide portion 83 is used for transmitting a signal from the third light guide path 43 to the fourth light guide path 44.

According to the second embodiment as described above, the same effects as those of the first embodiment described above can be also exerted.

Third Embodiment

Next, a robot according to a third embodiment of the invention will be described.

Figure 10:
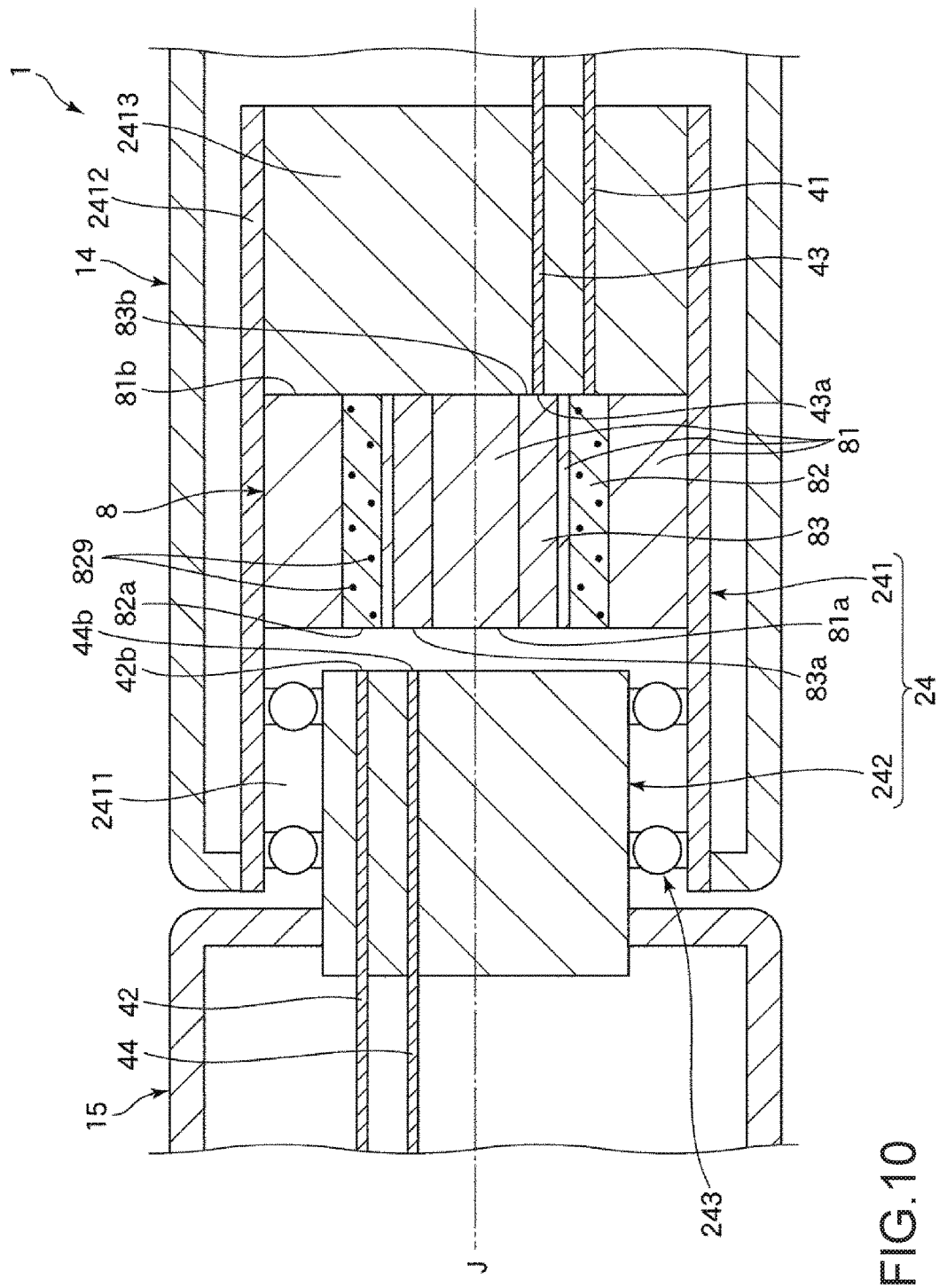
FIG. 10 is a sectional view illustrating a joint portion which is provided in a robot according to a third embodiment of the invention.
Figure 11:
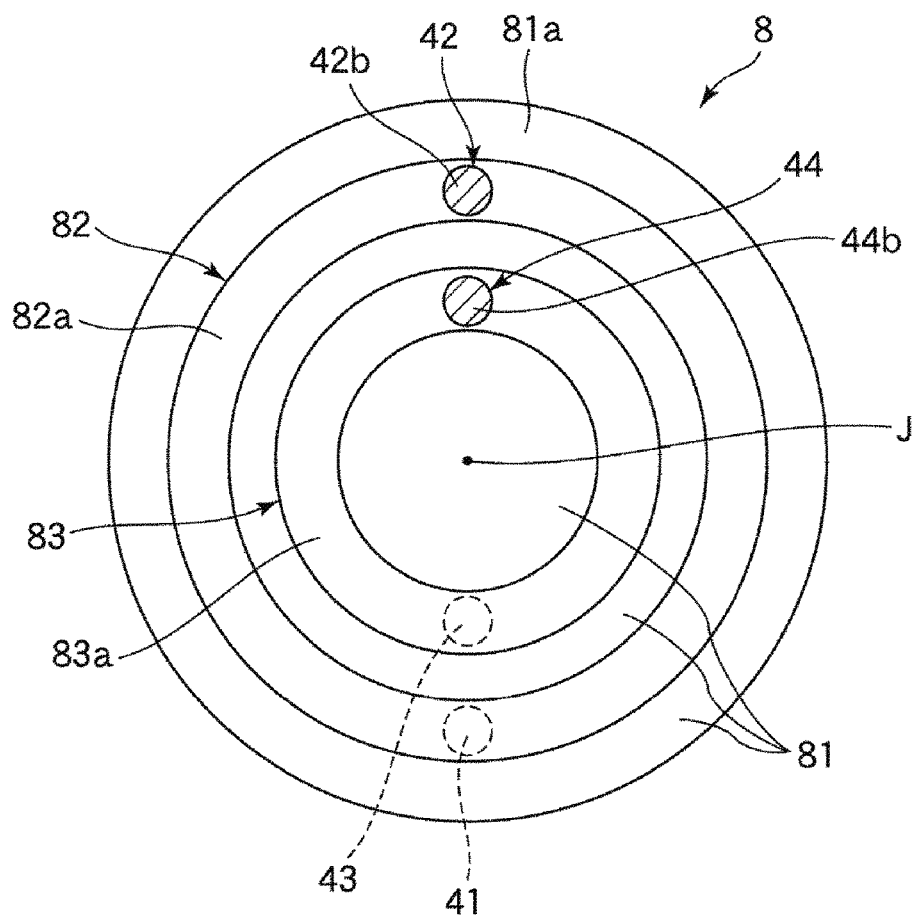
FIG. 11 is a plan view of a light rotary joint illustrated in FIG. 10.

FIG. 10 is a sectional view illustrating a joint portion which is provided in a robot according to a third embodiment of the invention. FIG. 11 is a plan view of the light rotary joint illustrated in FIG. 10.

The present embodiment is the same as the first embodiment described above except that the configuration of the light rotary joint 8 is different.

In the following description, contents related to the present embodiment and differences from the first embodiment described above will be mainly described and description of the same matters will be omitted. In addition, in FIG. 10, the same reference numerals are given to the same configurations as those in the embodiment described above.

As illustrated in FIG. 10 and FIG. 11, the proximal end surface 44b of the fourth light guide path 44 is positioned at a position deviated from the rotation axis J in a plan view as seen in the axial direction of the rotation axis J. The deviated amount of the proximal end surface 44b of the fourth light guide path 44 from the rotation axis J is less than the deviated amount of the proximal end surface 42b of the second light guide path 42 from the rotation axis J.

In addition, the second light guide portion 83 is provided inside the first light guide portion 82 and has a cylindrical shape about the rotation axis J. In addition, the distal end surface 83a of the second light guide portion 83 is positioned on a plane perpendicular to the rotation axis J and the entire region thereof is exposed from the distal end surface 81a of the base portion 81. In addition, the distal end surface 83a faces the proximal end surface 44b of the fourth light guide path 44. In other words, the distal end surface 83a of the second light guide portion 83 and the proximal end surface 44b of the fourth light guide path 44 overlap each other in a plan view seen in the axial direction of the rotation axis J. Therefore, the light emitted from the distal end surface 83a of the second light guide portion 83 is more reliably incident on the proximal end surface 44b of the fourth light guide path 44, and, in addition, the light emitted from the proximal end surface 44b of the fourth light guide path 44 is more reliably incident on the distal end surface 83a of the second light guide portion 83. Since the second light guide portion 83 has a cylindrical shape about the rotation axis J, even when the fourth light guide path 44 rotates together with the rotation portion 242 about the rotation axis J, a state where the distal end surface 83a of the second light guide portion 83 and the proximal end surface 44b of the fourth light guide path 44 always face each other is maintained. Therefore, regardless of the rotation state of the rotation portion 242, the second light guide portion 83 and the fourth light guide path 44 can be optically connected to each other.

In addition, the proximal end surface 83b of the second light guide portion 83 is also positioned on a plane perpendicular to the rotation axis J and the entire region thereof is exposed from the proximal end surface 81b of the base portion 81. In addition, the proximal end surface 83b is connected to the distal end surface 43a of the third light guide path 43 at a portion thereof. Therefore, the light emitted from the proximal end surface 83b of the second light guide portion 83 is more reliably incident on the distal end surface 43a of the third light guide path 43 and the light emitted from the distal end surface 43a of the third light guide path 43 is more reliably incident on the proximal end surface 83b of the second light guide portion 83. Accordingly, the second light guide portion 83 and the third light guide path 43 can be optically connected.

As described above, the second light guide portion 83 is optically connected to the fourth light guide path 44 on the distal end side thereof and optically connected to the third light guide path 43 on the proximal end side thereof. Therefore, the optical communication between the third light guide path 43 and the fourth light guide path 44 can be performed via the second light guide portion 83.

As described above, the second light guide portion 83 is fixed to the third light guide path 43 and has a tubular shape about the rotation axis J and the proximal end portion of the fourth light guide path 44 (end portion of light rotary joint 8 side) faces the second light guide portion 83. Accordingly, regardless of the rotation state of the arm 15, the third light guide path 43 and the fourth light guide path 44 can be optically connected via the second light guide portion 83.

According to the third embodiment as described above, the same effects as those of the first embodiment described above can be exerted.

In the present embodiment, although the thickness (difference between outer diameter and inner diameter) of the second light guide portion 83 is more than the diameters of the third and fourth light guide paths 43 and 44, the thickness thereof is not limited thereto, may be equal to the diameters of the third and fourth light guide paths 43 and 44, or may be less than the diameter of the third and fourth light guide paths 43 and 44.

In addition, the second light guide portion 83 can be optically connected to the fourth light guide path 44 on the distal end side thereof and as long as the second light guide portion 83 can optically connect with the third light guide path 43 on the proximal end side thereof, the second light guide portion 83 is not particularly limited, regardless of the rotation state of the rotation portion 242. For example, as long as at least the distal end surface 83a of the second light guide portion 83 is annular about the rotation axis J, the shape of the other portion thereof is not particularly limited. In addition, as long as the distal end surface 83a always faces the proximal end surface 44b of the fourth light guide path 44, that is, as long as the distal end surface 83a overlaps with the movement locus of the proximal end surface 44b over the entire circumference in a plan view seen in the axial direction of the rotation axis J while the rotation portion 242 makes one rotation about the rotation axis J, the distal end surface 83a may not have a circular annular shape about the rotation axis J (same as shape of first light guide portion 82 illustrated in FIG. 5 and FIG. 6). Further, the distal end surface 83a may not face the proximal end surface 44b as long as the distal end surface 83a is always optically connected the fourth light guide path 44 and the distal end surface 83a to each other while the rotation portion 242 makes one rotation about the rotation axis J.

In addition, for example, the second light guide portion 83 may have an outer diameter gradually decreasing portion whose outside diameter gradually decreases from the distal end side toward the proximal end side as in the first light guide portion 82 in the second embodiment described above or the proximal end surface 44b may be obliquely cut into an oblique incision tubular shape. Accordingly, the same effect as that of the first light guide portion 82 can be exerted.

In addition, for example, the second light guide portion 83 may include a dispersing material similarly to the first light guide portion 82.

Fourth Embodiment

Next, a robot according to the fourth embodiment of the invention will be described.

Figure 12:
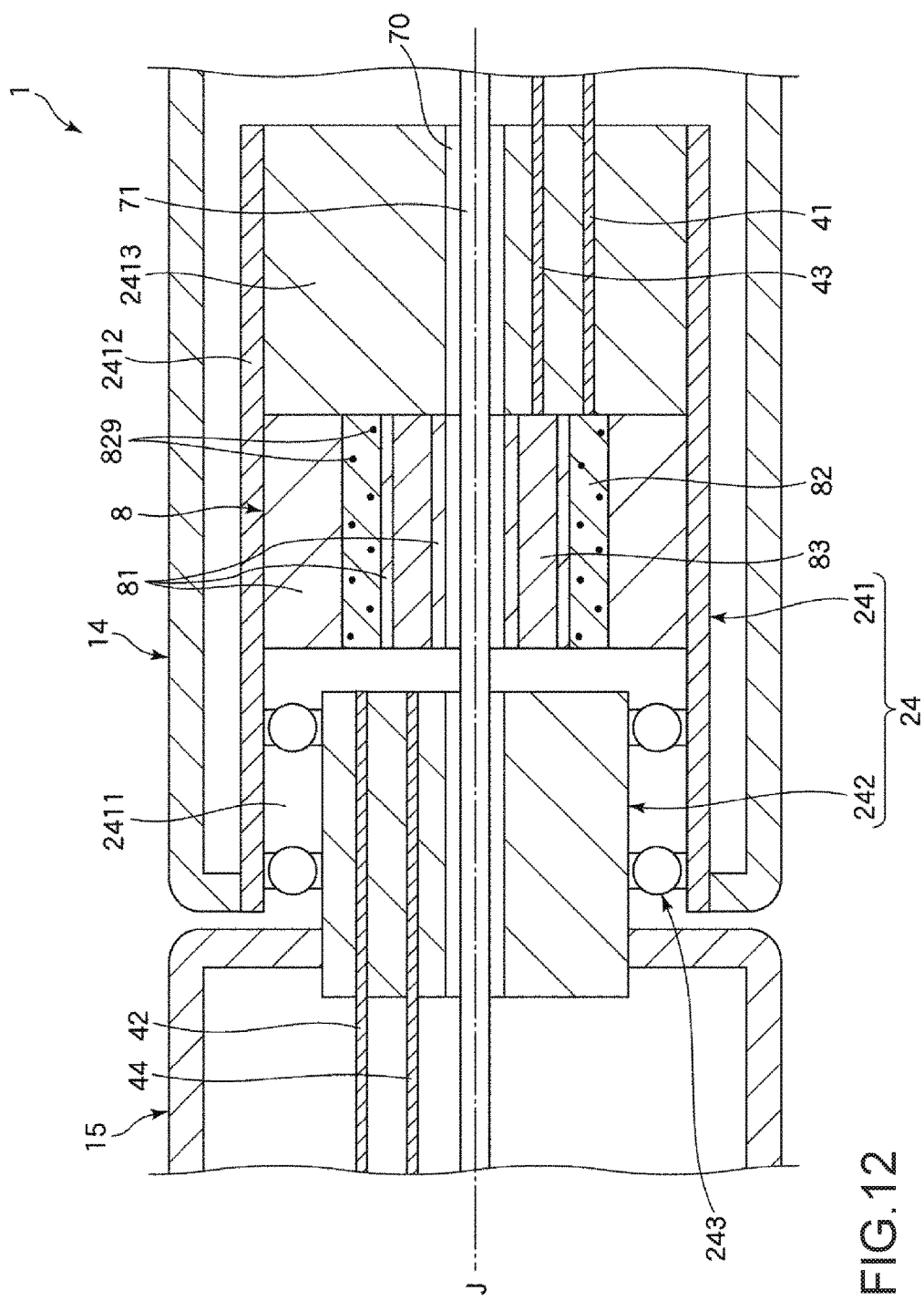
FIG. 12 is a sectional view illustrating a joint portion which is provided in a robot according to a fourth embodiment of the invention.

FIG. 12 is a sectional view illustrating a joint portion which is provided in the robot according to the fourth embodiment of the invention.

The present embodiment is the same as the third embodiment described above except that the configuration of the joint portion and the light rotary joint 8 is different.

In the following description, contents related to the present embodiment and differences from the third embodiment described above will be mainly described and description of the same matters will be omitted. In addition, in FIG. 12, the same reference numerals are given to the same configurations as those in the third embodiment described above.

As illustrated in FIG. 12, in the present embodiment, a through hole 70 penetrating the main body portion 241, the base portion 81, and the rotation portion 242 is formed. In addition, the through hole 70 is formed on the rotation axis J and is positioned so as to penetrate the inside of the second light guide portion 83. In addition, the electric wiring 71 is routed in the through hole 70.

As described above, the robot 1 of the present embodiment has an electric wiring 71 disposed inside the joint portion 24 and the electric wiring 71 is positioned inside the first light guide portion 82 and the second light guide portion 83. Accordingly, the space of the joint portion 24 can be effectively used and both optical wiring and electric wiring can be routed while the joint portion 24 is miniaturized. As described above, since the through hole 70 is positioned on the rotation axis J, the twist of the electric wiring 71 due to the rotation of the rotation portion 242 can be suppressed. Therefore, damage of the electric wiring 71 can be suppressed.

According to the fourth embodiment as described above, the same effects as those of the first embodiment described above can be exerted.

Fifth Embodiment

Next, a robot according to the fifth embodiment of the invention will be described.

Figure 13:
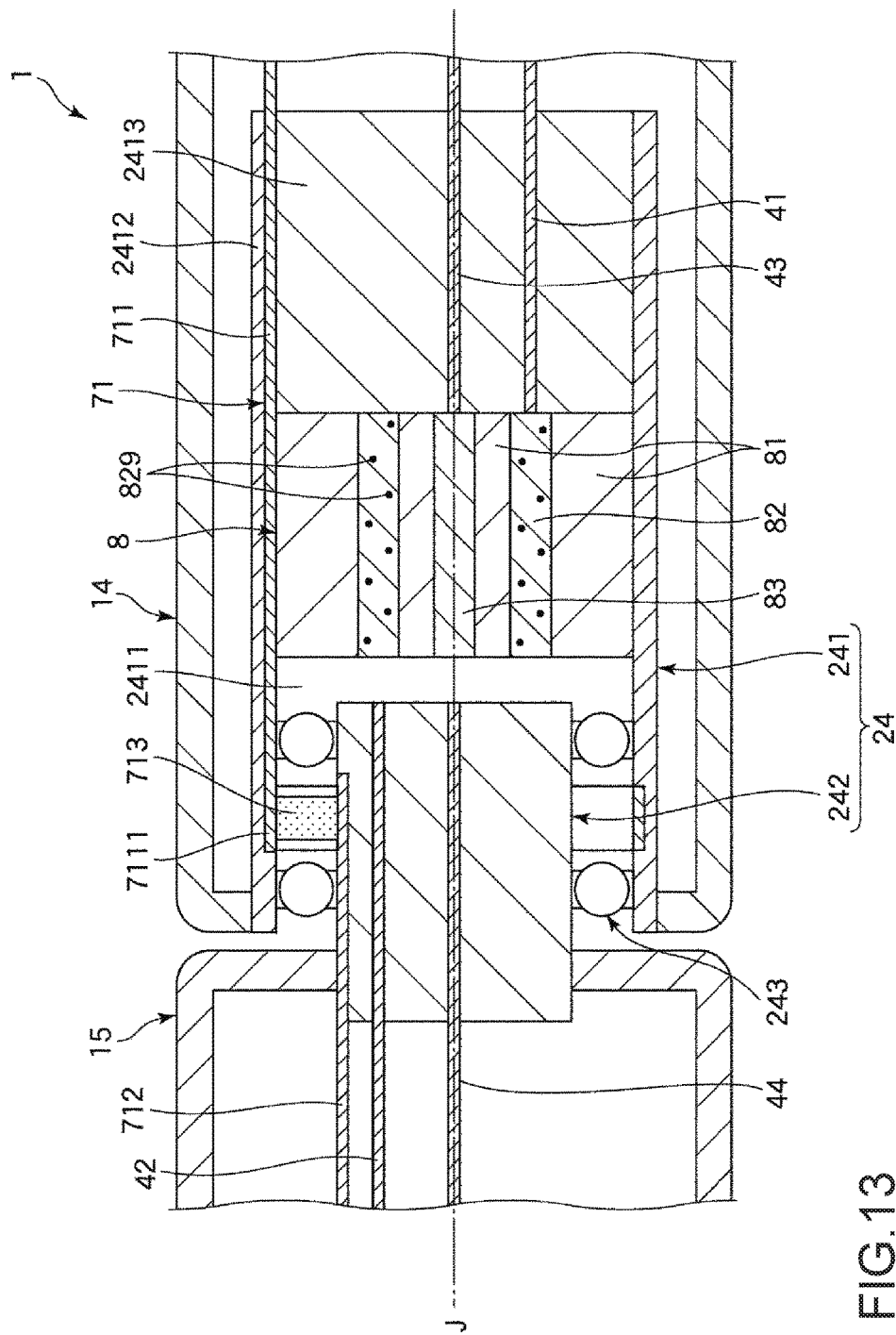
FIG. 13 is a sectional view illustrating a joint portion which is provided in a robot according to a fifth embodiment of the invention.

FIG. 13 is a sectional view illustrating a joint portion which is provided in the robot according to the fifth embodiment of the invention.

The present embodiment is the same as the third embodiment described above except that the configuration of the joint portion is different.

In the following description, contents related to the present embodiment and differences from the first embodiment described above will be mainly described and description of the same matters will be omitted. In addition, in FIG. 13, the same reference numerals are given to the same configurations as those in the first embodiment described above.

As illustrated in FIG. 13, an electric wiring 71 is provided in the joint portion 24. In addition, the electric wiring 71 has a first electric wiring 711 which is provided in the main body portion 241, a second electric wiring 712 which is provided in the rotation portion 242, and a connection portion 713 which electrically connects the first electric wiring 711 and the second electric wiring 712 to each other.

In addition, the first electric wiring 711 has an annular portion 7111 which is provided on an inside surface of a recessed portion 2411. In addition, the annular portion 7111 is disposed to face the side surface of the rotation portion 242.

In addition, the second electric wiring 712 is disposed on the side surface of the rotation portion 242. The proximal end portion of the second electric wiring 712 faces the annular portion 7111. In addition, a connection portion 713 is fixed to the proximal end portion of the second electric wiring 712 and the connection portion 713 is in contact with the annular portion 7111. Accordingly, the first electric wiring 711 and the second electric wiring 712 are electrically connected via the connection portion 713. In addition, according to such a configuration, regardless of the rotation state of the rotation portion 242, a state where the first electric wiring 711 and the second electric wiring 712 are electrically connected via the connection portion 713 can be maintained.

As described above, the robot 1 of the present embodiment has the electric wiring 71 disposed inside the joint portion 24 and the electric wiring 71 is positioned outside the first light guide portion 82. Accordingly, the space of the joint portion 24 can be effectively used, and both optical wiring and electric wiring can be routed while the joint portion 24 is miniaturized. In the present embodiment, although there is one electric wiring 71, the number of the electric wiring 71 is not particularly limited and may be two or more. In the case, a plurality of annular portions 7111 may be disposed so as to deviate along the rotation axis J and a plurality of second electric wirings 712 may be disposed so as to deviate in the circumferential direction of the rotation portion 242.

According to the fifth embodiment as described above, the same effects as those of the first embodiment described above can be exerted.

Sixth Embodiment

Next, a robot according to the sixth embodiment of the invention will be described.

Figure 14:
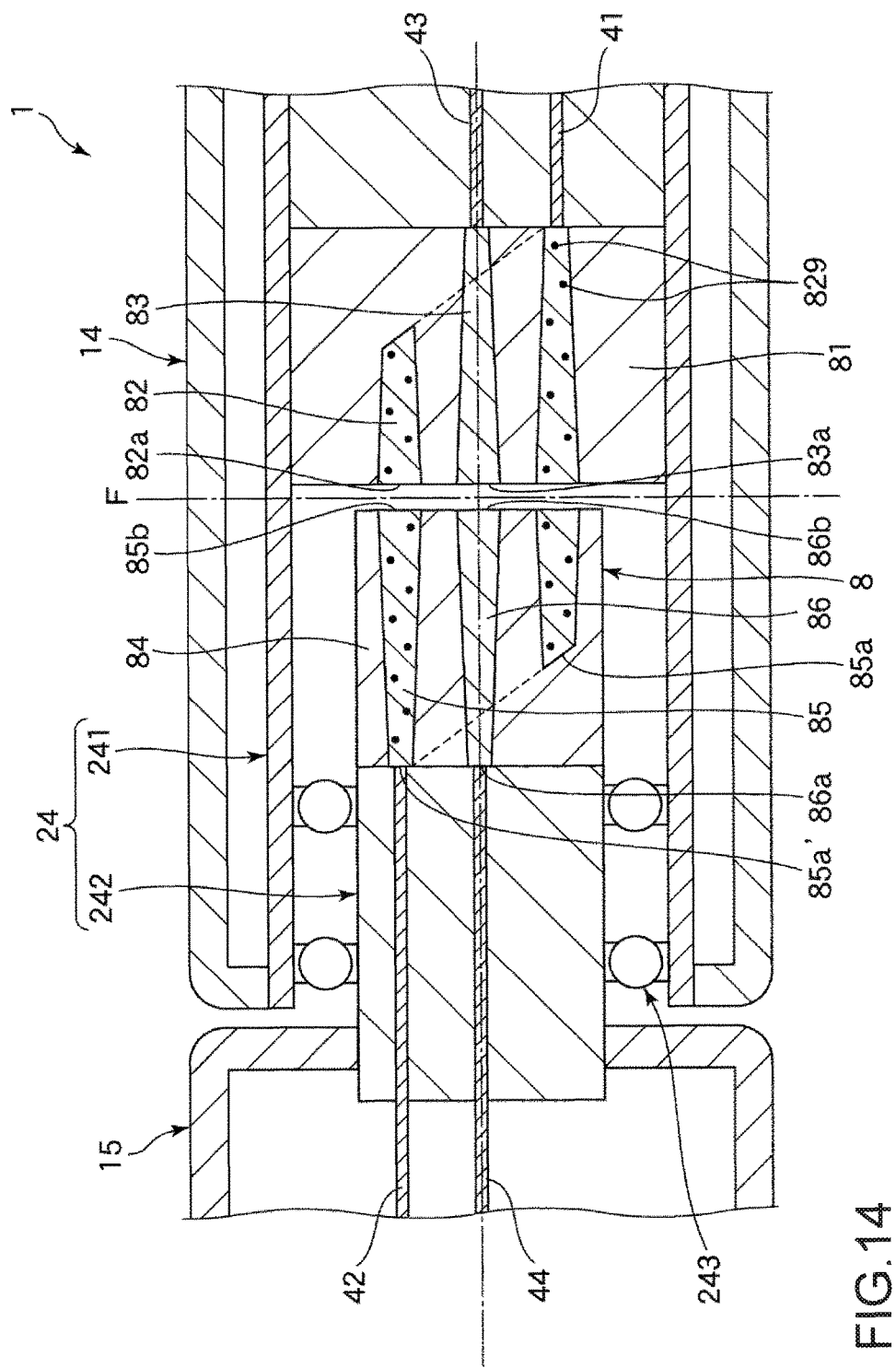
FIG. 14 is a sectional view illustrating a joint portion which is provided in a robot according to a sixth embodiment of the invention.

FIG. 14 is a sectional view illustrating a joint portion which is provided in the robot according to the sixth embodiment of the invention.

The present embodiment is the same as the second embodiment described above except that the structures of the joint portion and the light rotary joint 8 are different.

In the following description, contents related to the present embodiment and differences from the second embodiment described above will be mainly described and description of the same matters will be omitted. In addition, in FIG. 14, the same reference numerals are given to the same configurations as those in the first embodiment described above.

As illustrated in FIG. 14, in addition to the base portion 81 (first base portion) having the first light guide portion 82 and the second light guide portion 83, the light rotary joint 8 further includes a base portion 84 (second base portion) having a third light guide portion 85 and a fourth light guide portion 86.

The base portion 84 is positioned between the base portion 81 and the rotation portion 242 and is fixed to the rotation portion 242. In addition, the base portion 84 is disposed to be spaced apart from the base portion 81. The separation distance between the base portions 81 and 84 is not particularly limited, and the short distance is more preferable. Specifically, the distance is preferably 5 mm or less, more preferably 3 mm or less, further preferably 1 mm or less.

This makes it possible to suppress the decrease in light propagation efficiency between the first and second light guide portions 82 and 83 and the third and fourth light guide portions 85 and 86.

The third light guide portion 85 is configured to be line-symmetrical with the first light guide portion 82 with respect to a plane F orthogonal to the rotation axis J and is connected to the second light guide path 42 in the exposed portion 85a' which is provided in the distal end surface 85a. Similarly, the fourth light guide portion 86 is configured to be line-symmetrical with the second light guide portion 83 with respect to the plane F and is connected to the fourth light guide path 44 in the distal end portion 86a. Therefore, regardless of the rotation state of the rotation portion 242, the distal end surface 82a of the first light guide portion 82 and the proximal end surface 85b of the third light guide portion 85 face each other and the distal end surface 83a of the second light guide portion 83 and the proximal end surface 86b of the fourth light guide portion 86 face each other. With such a configuration, the loss of light at the light rotary joint 8 can be more effectively reduced.

According to the sixth embodiment as described above, the same effects as those of the first embodiment described above can be achieved.

Although the robot according to the invention has been described based on the illustrated embodiments, the invention is not limited thereto and the configuration of each portion can be replaced with an arbitrary configuration having the same function. In addition, any other constituent may be added to the invention. In addition, each embodiment may be appropriately combined.

In addition, in the embodiment described above, although the configuration in which the robot is a six-axis robot is described, the robot is not particularly limited and may be a dual-arm robot, a scalar robot, or the like, for example.

In addition, in the embodiment described above, although an example in which optical communication is performed by the first light guide path and the second light guide path and the light rotary joint is described, the application is not limited thereto and for example, at least one of the first light guide path and the second light guide paths can be used for sending light for illumination and light constituting an image.

The entire disclosure of Japanese Patent Application No. 2016-244749, filed Dec. 16, 2016 is expressly incorporated by reference herein.

What is claimed is:
1. A robot comprising:
   a first arm that includes a first light guide path;
   a second arm that includes a second light guide path;
   a joint portion that has a rotation axis and connects the first arm and the second arm to each other so as to be rotatable about the rotation axis, wherein the rotation axis extends parallel to a longitudinal axis of the first arm and a longitudinal axis of the second arm; and a light rotary joint that is provided between the first light guide path and the second light guide path inside the joint portion and that optically connects the first light guide path and the second light guide path to each other.

2. The robot according to claim 1,
wherein the light rotary joint has a first light guide portion which is fixed to the first light guide path and has a tubular shape about the rotation axis, and
wherein an end portion of the second light guide path on the light rotary joint side faces the first light guide portion.

3. The robot according to claim 2,
wherein the first light guide portion has an outer diameter gradually decreasing portion of which an outer diameter gradually decreases from a second light guide path side toward a first light guide path side.

4. The robot according to claim 2,
wherein the first light guide path has an oblique incision cylindrical shape.

5. The robot according to claim 2,
wherein the first light guide portion includes a diffusing material which diffuses light.

6. The robot according to claim 2, further comprising:
a third light guide path that is disposed on the first arm and is different from the first light guide path; and
a fourth light guide path that is disposed on the second arm and is different from the second light guide path,
wherein the light rotary joint has a second light guide portion which is disposed inside the first light guide portion and optically connects the third light guide path and the fourth light guide path to each other.

7. The robot according to claim 2,
wherein the second light guide portion is fixed to the third light guide path and has a tubular shape about the rotation axis, and
wherein an end portion of the fourth light guide path on the light rotary joint side faces the second light guide portion.

8. The robot according to claim 2,
wherein the second light guide portion is fixed to the third light guide path and is disposed on the rotation axis, and
wherein the end portion of the fourth light guide path on the light rotary joint side faces the second light guide portion.

9. The robot according to claim 2, further comprising:
electric wiring which is disposed inside the joint portion,
wherein the electric wiring is positioned inside the first light guide portion.

10. The robot according to claim 2, further comprising:
electric wiring which is disposed inside the joint portion,
wherein the electric wiring is positioned outside the first light guide portion.

11. The robot according to claim 1, further comprising:
an electronic component which is disposed closer to the second arm side than the joint portion and is connected to the second light guide path.

* * * * *